United States Patent [19]

Bazarian et al.

[11] 4,340,923

[45] Jul. 20, 1982

[54] ELECTRICAL CIRCUIT PROTECTOR

[75] Inventors: Albert Bazarian, Lake Forest; John W. Scannell, Glenview; Clifford H. Andersen, Park Ridge, all of Ill.

[73] Assignee: General Instrument Corporation, New York, N.Y.

[21] Appl. No.: 243,198

[22] Filed: Mar. 12, 1981

[51] Int. Cl.³ .......................... H02H 1/04; H02H 3/22

[52] U.S. Cl. ...................................... 361/120; 361/129

[58] Field of Search ............... 361/119, 120, 129, 130; 313/178, 218

[56] References Cited

U.S. PATENT DOCUMENTS

| | | | |
|---|---|---|---|
| 3,100,274 | 8/1963 | Luftman et al. | 313/178 |
| 4,013,927 | 3/1977 | Gilberts | 361/119 |
| 4,015,172 | 3/1977 | Peche et al. | 361/129 |
| 4,132,915 | 1/1979 | Wilms | 361/120 X |

OTHER PUBLICATIONS

R. K. Traeger and E. F. Ehrman, "The Lightning Arrestor Connector",IEEE Trans. on Parts, Hybrids, and Packaging, vol. PHP-12, No. 2, pp. 89-94, Jun. 1976.

J. P. Brainard and L. A. Andrews, "Dielectric Stimulated Arcs in Lightning Arrestor Connectors", IEEE Trans. on Comp., . . . Technology, CHMT-2, No. 3, pp. 309-316, Sep. 1979.

*Primary Examiner*—Reinhard J. Eisenzopf
*Attorney, Agent, or Firm*—Barry R. Lipsitz

[57] ABSTRACT

A gas filled surge arrestor is combined with an additional electrode to form a back-up air gap surge arrestor axially aligned therewith. The size of the air gap is held to a predetermined distance by a high dielectric ceramic sandwiched between the additional electrode and an intermediate electrode common to both arrestors. The outside diameter of the ceramic is smaller than that of the electrodes forming the air gap. The presence of the ceramic creates a pre-ionization level of electrons which facilitate the occurance of breakdown at a consistent, repeatable level. The additional electrode also serves as a collar to center the surge arrestor assembly in an electrically conductive casing, forming a unit adapted for insertion into a standard retaining cup. The electrode-ceramic sandwich is held together by a retaining washer which exerts a spring force to keep the elements in proper spaced relation to one another.

12 Claims, 1 Drawing Figure

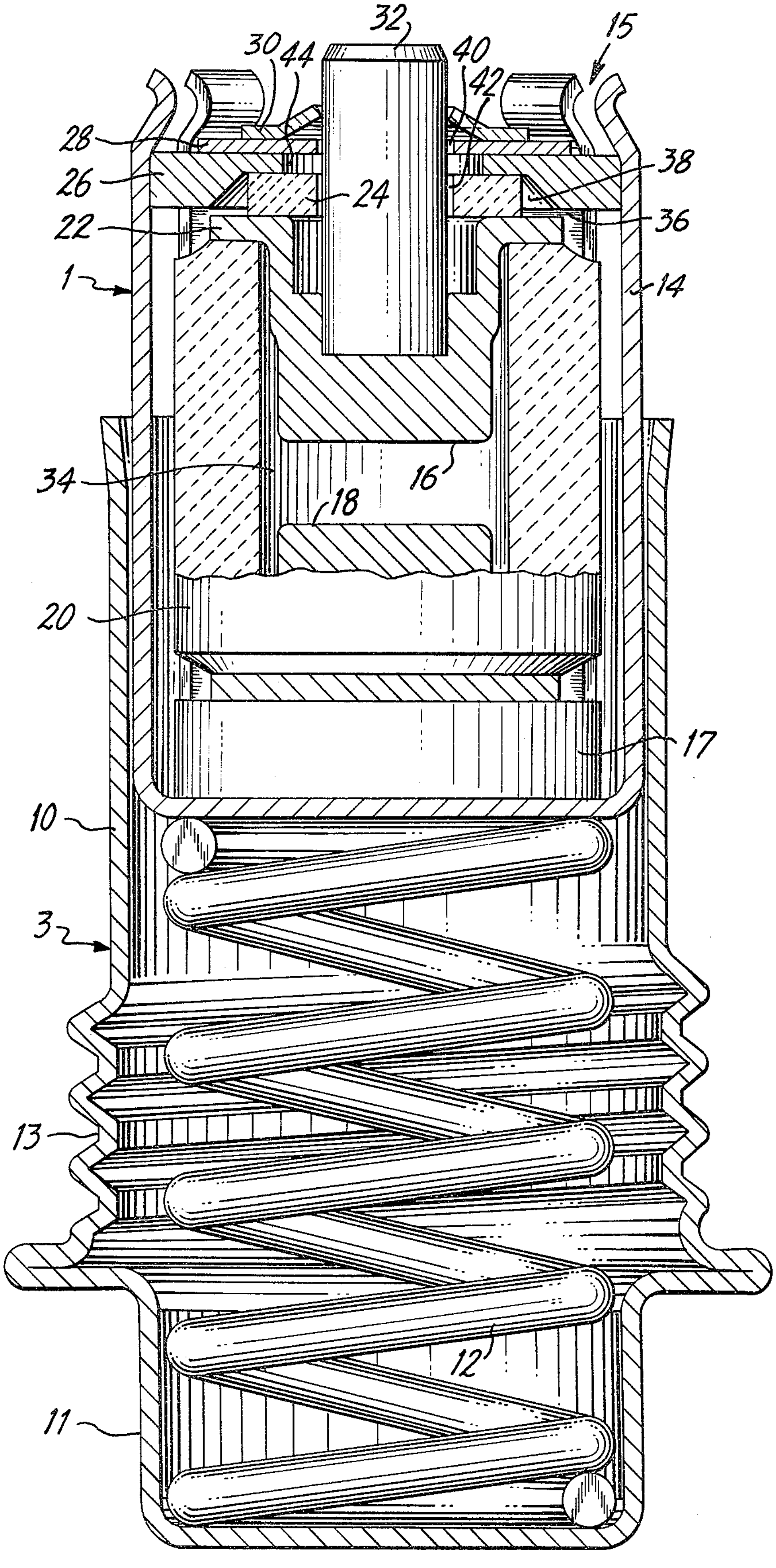
32
30
44
40
42
15
28
26
38
24
22
36
1
14
34
16
18
20
17
10
3
13
12
11

ELECTRICAL CIRCUIT PROTECTOR

The present invention relates to apparatus for protecting a circuit or the like from electrical overload and, more particularly, to an apparatus wherein a gas filled surge arrestor and an air gap surge arrestor share a common electrode and are axially aligned within a single casing designed to be inserted into a standard retaining cup.

Commonly, exposed communications lines, such as those utilized by telephone companies and the like, are protected against electrical overloads by a surge arrestor which is connected between the line and ground. In the past, the surge arrestors utilized in this manner were of the carbon block variety. Such a surge arrestor comprises a pair of electrodes separated by an air gap which is open to the atmosphere. In the event of an electrical overload, caused, for example, by lightning striking the telephone line, the gap between the electrodes is bridged, temporarily grounding the communications line, such that the electrical overload is dissipated. In this manner, electrical circuits connected to the telephone lines and personnel are protected.

Carbon block-type surge arrestors are currently being replaced by gas filled surge arrestors which use metal electrodes that are hermetically sealed within a ceramic insulator tube. The electrodes of the gas filled surge arrestors are commonly spaced 40 mils apart, as compared to the 3 mils space in a carbon block surge arrestor. However, a special gas, at subatmospheric pressure, is permanently sealed within the ceramic insulator tube to impart the desired electrical characteristics to the device.

The DC breakdown voltage of a typical gas filled surge arrestor is approximately 400 volts. However, should the hermetic seal of the ceramic insulator tube become broken, permitting an air leak between the electrodes, the DC breakdown voltage of the gas filled surge arrestor, now vented to the air, becomes considerably higher, approximately 3,500 volts. Once the hermetic seal on the gas filled surge arrestor is broken, the surge arrestor has a DC breakdown voltage which is too high to adequately protect the communications circuits. For this reason, telephone companies have often required that an air gap type surge arrestor be installed in parallel with the gas filled surge arrestor when the carbon block surge arrestor is replaced. An air gap surge arrestor having a 3 mil gap spacing typically has a DC breakdown voltage of approximately 600–1,000 volts. Thus, the combination of the different types of arrestors assures that the DC breakdown voltage will never exceed that of the air gap surge arrestor, even if the seal on the gas filled surge arrestor has been broken.

It is known to provide various combinations of air gap type surge arrestors as failsafe mechanisms to protect a circuit upon failure of the primary gas filled arrestor. In one type of protector, the air gap and gas filled arrestors are physically distinct and each is provided with its own cylindrical casing. This device requires almost twice the space of a standard gas filled surge arrestor. Thus, such protector will not fit into the standard retaining cup used in the telephone industry.

Another type of protector incorporates a pair of electrodes axially aligned with the conventional gas filled surge arrestor and separated by an insulator to provide an air gap there between. The air gap has a length equal to the thickness of the insulator and serves as a secondary surge arrestor to provide back up protection. While this configuration produces an assembly which fits into the standard retaining cup it has not proved adequate to meet the electrical performance specifications desired by its end users; e.g., the telephone companies.

It is, therefore, a prime object of the present invention to provide a circuit protector including axially aligned gas filled and air gap surge arrestors forming a unit of simplified design which is highly compact so as to require minimum space, such that same can be inserted to a standard retaining cup.

It is another object of the present invention to provide a circuit protector wherein the gas filled and air gap surge arrestors share a common electrode.

It is a further object of the present invention to provide a circuit protector having gas filled and air gap arrestors which is manufactured as a unit to facilitate installation thereof.

In accordance with the present invention, apparatus is provided which protects a circuit from an electrical overload. The apparatus comprises an electrically conductive casing with a gas filled surge arrestor situated therein. The gas filled surge arrestor has first and second conductive electrodes spaced apart to provide a spark gap thereacross and a hermetically sealed gaseous environment in the region of the spark gap. An additional electrode is spaced from and axially aligned with the gas filled surge arrestor. The first and additional electrodes are separated by an air gap so as to form an air gap surge arrestor. Discharge means are interposed between the first and additional electrodes for emitting ions into the air gap in the presence of the predetermined electric potential across the air gap. The second and additional electrodes are operatively connected to the casing.

A preferred embodiment of the invention will now be explained with reference to the FIGURE. The FIGURE is a cross-sectional view of the circuit protector of the present invention shown mounted in the retaining cup.

As shown in the FIGURE, the circuit protector of the present invention, generally designated 1, is situated within a standard retaining cup, generally designated 3. Cup 3 is composed of an electrically conductive material, has a generally hollow cylindrical shape and comprises a body portion 10 and a head portion 11.

Body portion 10 is adapted to receive protector 1 therein. The exterior surface of body portion 10 is provided with screw threads 13 designed to mesh with the threads of a standard holder not shown. Protector 1 is spring loaded by spring 12 so that it makes proper contact within the standard holder when cup 3 is screwed into the holder.

Protector 1 comprises an electrically conductive, substantially cylindrical hollow casing 14 having an open end 15. Within casing 14 is situated a hermetically sealed gas filled surge arrestor 34 of conventional design, such as number CB-297, available from General Instrument Corporation, Clare Division, of Chicago, Ill. Arrestor 34 comprises a sealed cylindrical insulating tube 20 preferably composed of ceramic material within which are situated a pair of normally isolated electrodes 16 and 18 which extend out of either end thereof. Within the insulated tube 20 electrodes 16 and 18 are separated by a gas filled space or gap approximately 40 mils in length.

The internal configuration of gas filled surge arrestor 34 forms no portion of the present invention. However, it should be appreciated that gas filled surge arrestors have a variety of different configurations, compositions and electrical characteristics that are well known in the art and are commercially available. Many of these arrestors would be suitable for use in this application.

The extended end of electrode 18 of arrestor 34 is separated from the interior wall of the closed end of casing 14 by means of a pressure plate 17. Plate 17 is composed of low melting conductive material (e.g., solder) of the type which is commonly provided as a protective device for connecting one electrode of a gas filled surge arrestor to its surrounding conductive casing.

Electrode 16 forms a common electrode for both the gas filled surge arrestor and the air gap surge arrestor. Electrode 16 is provided with a flange portion 22 which extends beyond the confines of tube 20.

Elongated connecting means comprising an electrically conductive pin or rod like member 32 extends from electrode 16 and at least partially through the open end 15 of casing 14. Electrode pin 32 is electrically connected to electrode 16. An additional electrode 26 in the form of an electrically conductive annular member is situated with its central opening 44 surrounding at least a portion of electrode pin 32 and with its peripheral edge abutting and electrically contacting the interior surface of casing 14.

Additional electrode 26 has a frustum shaped cavity 38 into which a high dielectric ceramic 24 fits. High dielectric ceramic 24 is of annular shape and has a central opening 42 surrounding at least a portion of electrode pin 32. The outside diameter of ceramic 24 is such that it fits within the smallest diameter end of the frustum cavity 38. The thickness of ceramic 24 is greater than the depth of frustum shaped cavity 38. Thus, an acute angle is formed between the edge of ceramic 24 and the bevelled sides of frustum shaped cavity 38. An air gap 36 is formed between additional electrode 26 and the flanged end 22 of electrode 16. The length of air gap 36 is the difference between the thickness of ceramic 24 and the depth of frustum shaped cavity 38. The diameter of opening 44 in additional electrode 26 is such that additional electrode 26 is electrically isolated from electrode pin 32. The relationship of ceramic 24 to electrode pin 32 and frustum shaped cavity 38 serves to maintain opening 44 in ceramic 26 in spaced and centered relation to electrode pin 32 so that electrical isolation between additional electrode 26 and electrode pin 32 is maintained. In this manner, additional electrode 26 serves to axially center gas filled surge arrestor 34 and air gap surge arrestor 36 within casing 14.

It will now be appreciated that the gas filled surge arrestor comprising electrodes 16 and 18 and the air gap surge arrestor comprising electrodes 16 and 26 are axially aligned and share a common electrode 16, thereby eliminating duplication of parts and reducing the amount of space required by the protector.

The air gap surge arrestor defined by air gap 36 between additional electrode 26 and the flanged end 22 of electrode 16 is designed to have a DC breakdown voltage which is higher (typically 600 to 1,000 volts) than the DC breakdown voltage (typically 400 volts) of the gas filled surge arrestor 34. Should the hermetic seal of the gas filled surge arrestor 34 become broken, the air leaking between the electrodes will cause the DC breakdown voltage to increase to approximately 3,500 volts. In this vented condition the DC breakdown voltage of the air gap surge arrestor is considerably lower than the DC breakdown voltage of the vented gas filled surge arrestor. Thus the integral air gap surge arrestor serves to assure that the protector will never have a breakdown voltage above that of the air gap surge arrestor regardless of the condition of the gas filled surge arrestor. As noted above, the length of air gap 36 which determines the DC breakdown voltage of the air gap surge arrestor is set by the difference in thickness between the ceramic 24 and the depth of frustum shaped cavity 38.

In order to fix additional electrode 26, ceramic 24, and the flanged end 22 of electrode 16 in proper axial alignment and intimate contact, a spring loaded retaining washer 30 is used. Retaining washer 30 locks onto electrode pin 32. An insulating washer 28 having an opening 40 is interposed between spring washer 30 and additional electrode 26 to provide electrical isolation between electrode pin 32 and additional electrode 26. In the event that an electrically nonconducting spring washer were used there would be no need for insulating washer 28.

The use of high dielectric ceramic 24 provides substantial improvement in the performance of the electrical circuit protector of the present invention over prior art devices. An example of a high dielectric ceramic which may be used in the present invention is barium titanite. The presence of this ceramic between additional electrode 26 and electrode 16 creates a pre-ionization level of electrons to insure that breakdown consistently occurs at the same voltage level. When a voltage potential of a given level is applied across additional electrode 26 and electrode 16, a surface emission of very small current is produced across the edge of ceramic 24. The ionized products of this emmission are discharged into air gap 36. The effect is to eliminate the statistical time lag normally present. The production of an adequate amount of charged particles at a minimum potential level is facilitated by the proper choice of the angle formed between the edge of ceramic 24 and the beveled edge of the frustum shaped cavity 38. The preferred angle is 45° but in practice any angle in the range of about 30° to 60° will be adequate.

It will now be appreciated by those skilled in the art that the protector of the present invention is a combination of a gas filled surge arrestor and an air gap surge arrestor axially aligned within the same casing and sharing a common electrode. The device is so designed such that the protector combining both the air gap surge arrestor and the gas filled surge arrestor requires only slightly more space within the retaining cup than a standard gas filled surge arrestor alone. The use in the present invention of a high dielectric ceramic within a frustum shaped cavity improves the pulse response of the air gap device. A spring washer is used to hold the parts of the air gap assembly in firm contact with one another and facilitate the control of proper spacing. The design of the circuit protector assembly is such that additional electrode 26 performs a secondary function of centering the surge arrestor assembly in casing 14. This design fulfills the requirements that additional electrode 26 be in electrical contact with casing 14 and that it be electrically isolated from electrode pin 32. Thus the rather complicated and expensive insulators or boots used in prior art devices are not necessary in the design of the present invention.

While only a single preferred embodiment of the present invention has been disclosed for purposes herein, it is to be understood that many variations and modifications could be made thereto. It is intended to cover all of these variations and modifications which fall within the scope of the present invention as defined by the following claims.

We claim:

1. Apparatus for protecting a circuit from electrical overload comprising:
(a) an electrically conductive casing;
(b) a gas filled surge arrestor situated within said casing and having first and second conductive electrodes spaced apart to provide a spark gap thereacross and a hermetically sealed gaseous environment in the region of said spark gap;
(c) an additional electrode spaced from and axially aligned with said gas filled surge arrestor, said first and additional electrodes being separated by an air gap so as to form an air gap surge arrestor and said second and additional electrodes being operatively electrically connected to said casing;
(d) discharge means comprising a high dielectric ceramic, sandwiched between and in contact with said first and additional electrodes, for causing ions to be emitted into said air gap in the presence of a predetermined electric potential across said air gap; and
(e) fastener means to maintain said sandwiched relation.

2. The apparatus of claim 1 wherein said additional electrode contains a cavity having a depth of smaller dimension than the thickness of said ceramic, said cavity having sides bevelled outward from the interior of the additional electrode to form an area into which said ceramic fits whereby an acute angle is formed between the edge of said ceramic and the bevelled sides of said cavity and the length of said air gap is the difference between the thickness of said ceramic and the depth of said cavity.

3. The apparatus of claim 2 wherein said additional electrode and said ceramic each have an opening therein, said apparatus further comprising an electrode pin axially extending from said first electrode and through said openings in said additional electrode and said ceramic; said fastener means being coupled to said electrode pin for maintaining engagement between (i) said first electrode and said ceramic, and (ii) said ceramic and said additional electrode.

4. The apparatus of claim 3 wherein said fastener means comprises a spring loaded retaining washer secured to said electrode pin.

5. The apparatus of claim 4 further comprising insulator means sandwiched between and electrically insulating said retaining washer and said additional electrode.

6. The apparatus of claim 4 wherein said ceramic is composed of barium titanite.

7. Apparatus for protecting a circuit from electrical overload comprising:
(a) a hollow cylindrical electrically conductive casing;
(b) a gas filled surge arrestor situated within said casing and having first and second conductive electrodes spaced apart to provide a spark gap thereacross;
(c) a disc shaped additional electrode having a frustum shaped cavity therein and concentric therewith and a concentric opening therethrough, said opening being of smaller diameter than the smallest diameter end of said cavity, said additional electrode being spaced from and axially aligned with said gas filled surge arrestor, said first and additional electrodes being separated by an air gap so as to form an air gap surge arrestor and said second and additional electrodes being operatively electrically connected to said casing;
(d) a high dielectric ceramic sandwiched between said first and additional electrodes and fitted, at least in part, into said cavity;
(e) an electrode pin axially extending from said first electrode and through said opening in said additional electrode; and
(f) fastener means coupled to said electrode pin for maintaining engagement between (i) said first electrode and said ceramic, and (ii) said ceramic and said additional electrode.

8. The apparatus of claim 7 wherein the outside diameter of said additional electrode is substantially the same as the inside diameter of said casing whereby the additional electrode functions to axially center said gas filled and air gap surge arrestor assembly within said casing.

9. The apparatus of claim 8 wherein said fastener means comprises a spring loaded retaining washer secured to said electrode pin.

10. The apparatus of claim 7 or 9 wherein said ceramic is composed of barium titanite.

11. The apparatus of claim 2 or 7 wherein the DC breakdown voltage of said gas filled surge arrestor, when not vented to the atmosphere, is lower than the DC breakdown voltage between said first and additional electrodes.

12. The apparatus of claims 2 or 7 wherein the DC breakdown voltage between said gas filled surge arrestor, when same is vented to the atmosphere, is higher than the DC breakdown voltage between said first and additional electrodes.

* * * * *

UNITED STATES PATENT AND TRADEMARK OFFICE
CERTIFICATE OF CORRECTION

PATENT NO. : 4,340,923

DATED : July 20, 1982

INVENTOR(S) : Albert Bazarian et al

It is certified that error appears in the above-identified patent and that said Letters Patent is hereby corrected as shown below:

Claim 6 is changed to read as follows:

6. The apparatus of claim 1 or 4 wherein said ceramic is composed of barium titanite.

Signed and Sealed this

*Seventh* Day of *June 1983*

[SEAL]

*Attest:*

DONALD J. QUIGG

*Attesting Officer* *Acting Commissioner of Patents and Trademarks*